No. 820,077. PATENTED MAY 8, 1906.
G. S. WHITELEY.
VEHICLE WHEEL.
APPLICATION FILED MAY 31, 1905.

Witnesses:

Inventor:
George S. Whiteley
by E. E. Masson Atty.

UNITED STATES PATENT OFFICE.

GEORGE S. WHITELEY, OF BALTIMORE, MARYLAND.

VEHICLE-WHEEL.

No. 820,077.　　　　Specification of Letters Patent.　　　Patented May 8, 1906.

Application filed May 31, 1905. Serial No. 263,146.

*To all whom it may concern:*

Be it known that I, GEORGE S. WHITELEY, a citizen of the United States, residing at Baltimore, in the State of Maryland, have invented certain new and useful Improvements in Vehicle-Wheels, of which the following is a specification.

This invention relates to vehicle-wheels, particularly self-propelled road-vehicles; and its objects are to provide strong and comparatively inexpensive wheels which will have their rims elastically supported and in which the use of rubber tires may be dispensed with. I attain these objects by the construction illustrated in the accompanying drawings, in which—

Figure 1:
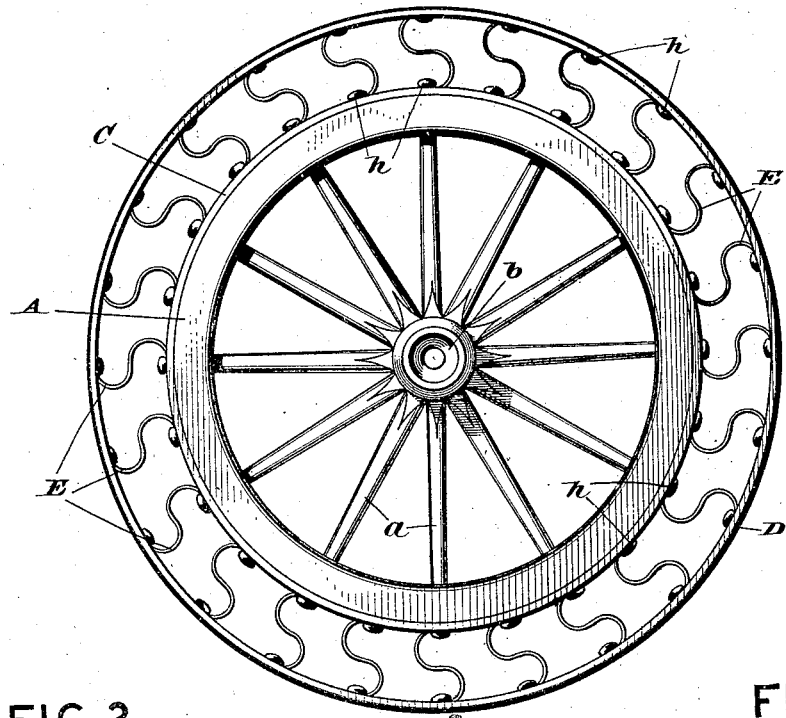
Figure 2:
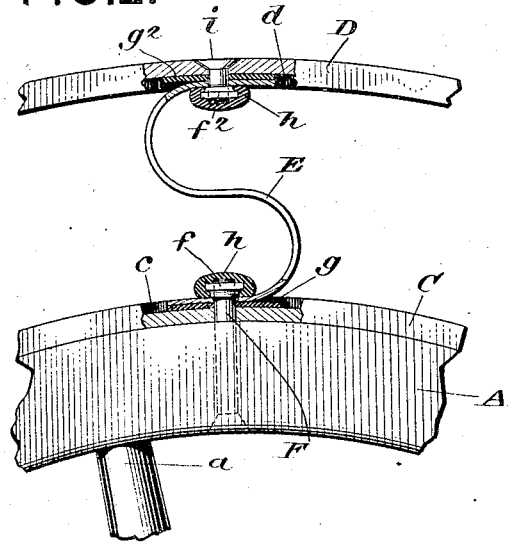
Figure 3:
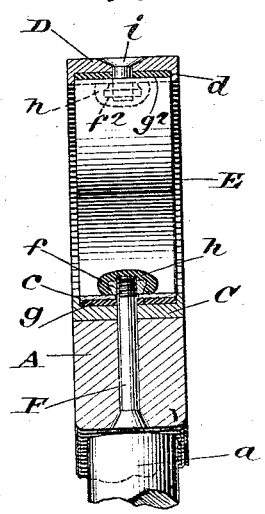

Figure 1 is a side view of a vehicle-wheel constructed in accordance with my invention. Fig. 2 is a side view, on a larger scale, of a portion of the felly and rim of the inner wheel, a portion of the outer rim of the wheel and one of the S-shape springs uniting said rims. Fig. 3 is a transverse section of the parts shown in Fig. 2.

In said drawings, A represents the wooden felly of a wheel having spokes $a$ and a hub $b$ of any suitable form and size. Around the felly is placed a rim C, of channel-iron, the channel portion or groove $c$ being in the outer or convex periphery. Around the rim C, but a few inches therefrom, there is another rim D, also of channel-iron, having its channel or groove $d$ on the inner or concave portion thereof. Between said rims C and D are placed a series of S-shaped springs E, of elastic flat metal. The inner end of each spring is secured to the rim C by means of a bolt F, which is made to pass also through the felly A, and thus secures also the rim to said felly. A rubber washer $g$ is placed between the spring E and the rim C to form a noiseless bearing between them, and a nut $f$ is screwed upon the end of the bolt F, and around and over said nut is placed a rubber cap $h$ to act as a cushion for the spring E if the latter is depressed sufficiently to come in contact therewith. The outer end of the spring E is secured to the outer rim D by means of a short bolt $i$ and nut $f^2$, a rubber washer $g^2$ being placed between the spring E and the rim D. A rubber cap $h$ is also placed around and over the nut $f^2$ to act as a cushion for the spring E. By these means a vehicle-wheel is obtained which has a rigid central portion and an elastically-supported rim well adapted to road-vehicles. If desired, another channel-rim with a groove on its periphery can be secured to the rim D and a rubber tire secured to said outer rim.

Having now fully described my invention, I claim—

1. A vehicle-wheel consisting of a central wheel having spokes and felly, a channel-iron rim secured to said felly, an outer channel-iron rim distant from the inner one and a series of S-shaped springs interposed and having their ends secured to both rims with bolts and nuts, and rubber-cap cushions over said nuts, substantially as described.

2. In a vehicle-wheel the combination of a central wheel having spokes and felly, a rim secured to said felly, an outer channel-iron rim distant from the inner one, a series of S-shaped springs interposed and having their ends secured to both rims and elastic washers interposed between the ends of the spring and each rim, substantially as described.

In testimony whereof I affix my signature in presence of two witnesses.

GEORGE S. WHITELEY.

Witnesses:
　E. E. MASSON,
　HENRY C. HOLTHAUS.